United States Patent
Rydén et al.

(10) Patent No.: US 11,582,581 B2
(45) Date of Patent: Feb. 14, 2023

(54) DETECTING WHEN A UE IS AIRBORNE

(71) Applicant: Telefonaktiebolaget LM Ericsson (publ), Stockholm (SE)

(72) Inventors: Henrik Rydén, Solna (SE); Sakib Bin Redhwan, Linköping (SE); Xingqin Lin, Santa Clara, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/046,263

(22) PCT Filed: Apr. 12, 2018

(86) PCT No.: PCT/SE2018/050377
§ 371 (c)(1),
(2) Date: Oct. 8, 2020

(87) PCT Pub. No.: WO2019/199211
PCT Pub. Date: Oct. 17, 2019

(65) Prior Publication Data
US 2021/0084447 A1    Mar. 18, 2021

(51) Int. Cl.
*H04W 4/029* (2018.01)

(52) U.S. Cl.
CPC .................... *H04W 4/029* (2018.02)

(58) Field of Classification Search
CPC .................... H04W 4/029; H04B 7/18506
See application file for complete search history.

(56) References Cited

U.S. PATENT DOCUMENTS

| | | | |
|---|---|---|---|
| 2017/0302368 A1* | 10/2017 | Trott | H04B 7/18502 |
| 2018/0118360 A1* | 5/2018 | Hirn | B64D 31/00 |
| 2019/0086988 A1* | 3/2019 | He | G06N 20/00 |
| 2019/0212724 A1* | 7/2019 | Phuyal | H04W 76/11 |

OTHER PUBLICATIONS

International Search Report and the Written Opinion of the International Searching Authority, issued in corresponding International Application No. PCT/SE2018/050377, dated Dec. 11, 2018, 11 pages.
Huawei et al. "Interference detection for drones", 3GPP TSG RAN WG1, Meeting #91, R1-1719466, Reno, USA, Nov. 27-Dec. 1, 2017, 14 pages.
ERICSSON "Interference detection in LTE networks with low altitude aerial vehicles" 3GPP TSG-RAN WG1 #90, R1-1714102, Prague, Czech Republic, Aug. 21-25, 2017, 5 pages.
NTT Docomo Inc. et al. "New SID on Enhanced Support for Aerial Vehicles" 3GPP TSG RAN Meeting #75, RP-170779 (revision of RP-170742), Dubrovnik, Croatia, Mar. 6-9, 2017, 4 pages.
Nokia et al. "Interference detection and UAV identification" 3GPP TSG-RAN WG2 #100, R2-1713408, Reno, USA, Nov. 27-Dec. 1, 2017, 8 pages.

* cited by examiner

Primary Examiner — Kabir A Timory
(74) Attorney, Agent, or Firm — Rothwell, Figg, Ernst & Manbeck, P.C.

(57) ABSTRACT

It is provided a method for detecting when a user equipment, UE, is airborne. The method is performed in a UE status detector and comprises the steps of: obtaining an indicator of variation of signal strengths for signals received in the UE, wherein the signals are transmitted for at least three different cells; and determining, based on the indicator of variation, when the UE is airborne.

22 Claims, 6 Drawing Sheets

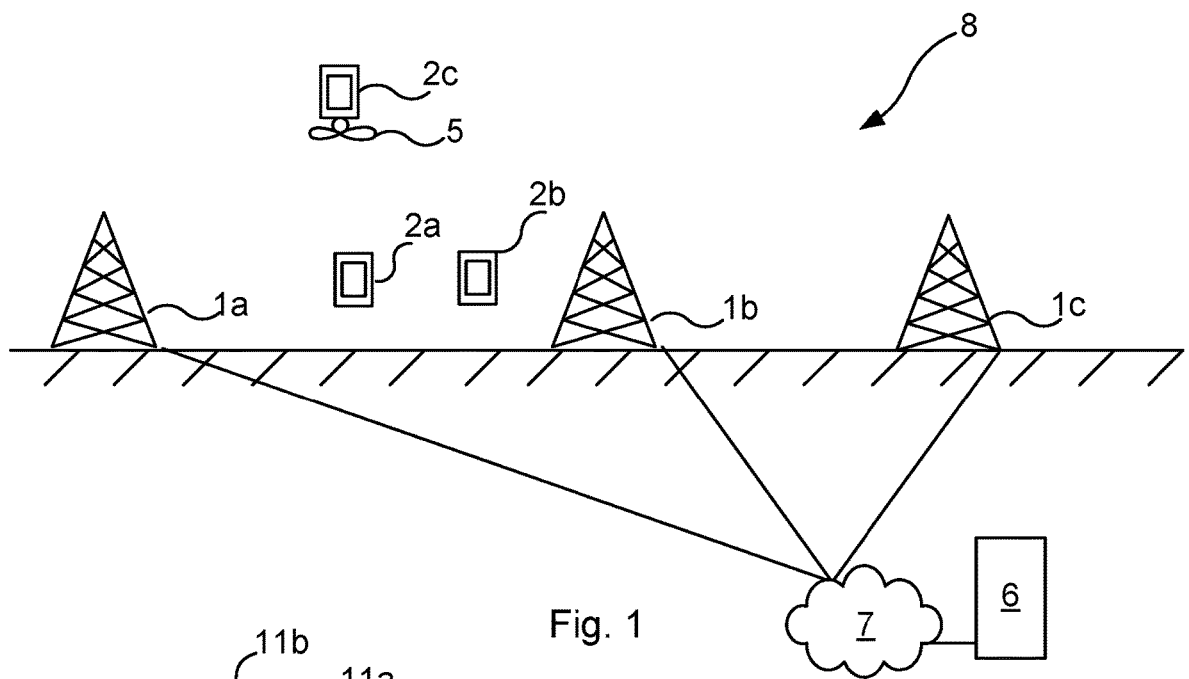
Fig. 1
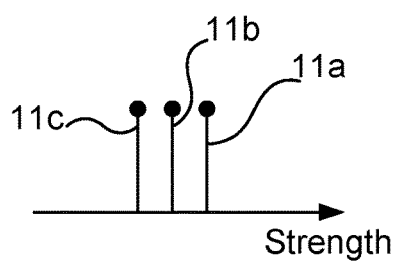
Fig. 2A
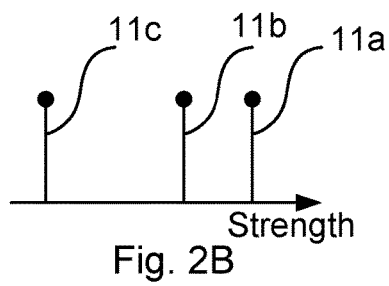
Fig. 2B
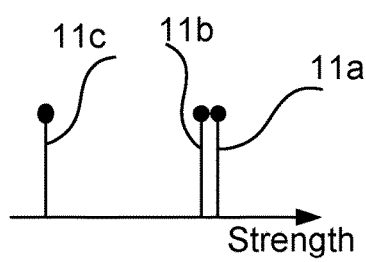
Fig. 2C
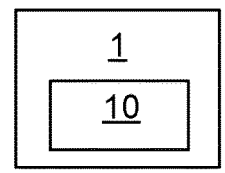
Fig. 3A
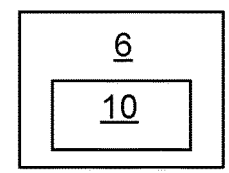
Fig. 3B
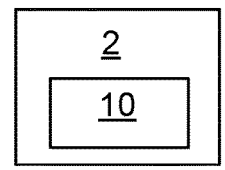
Fig. 3C
Fig. 3D

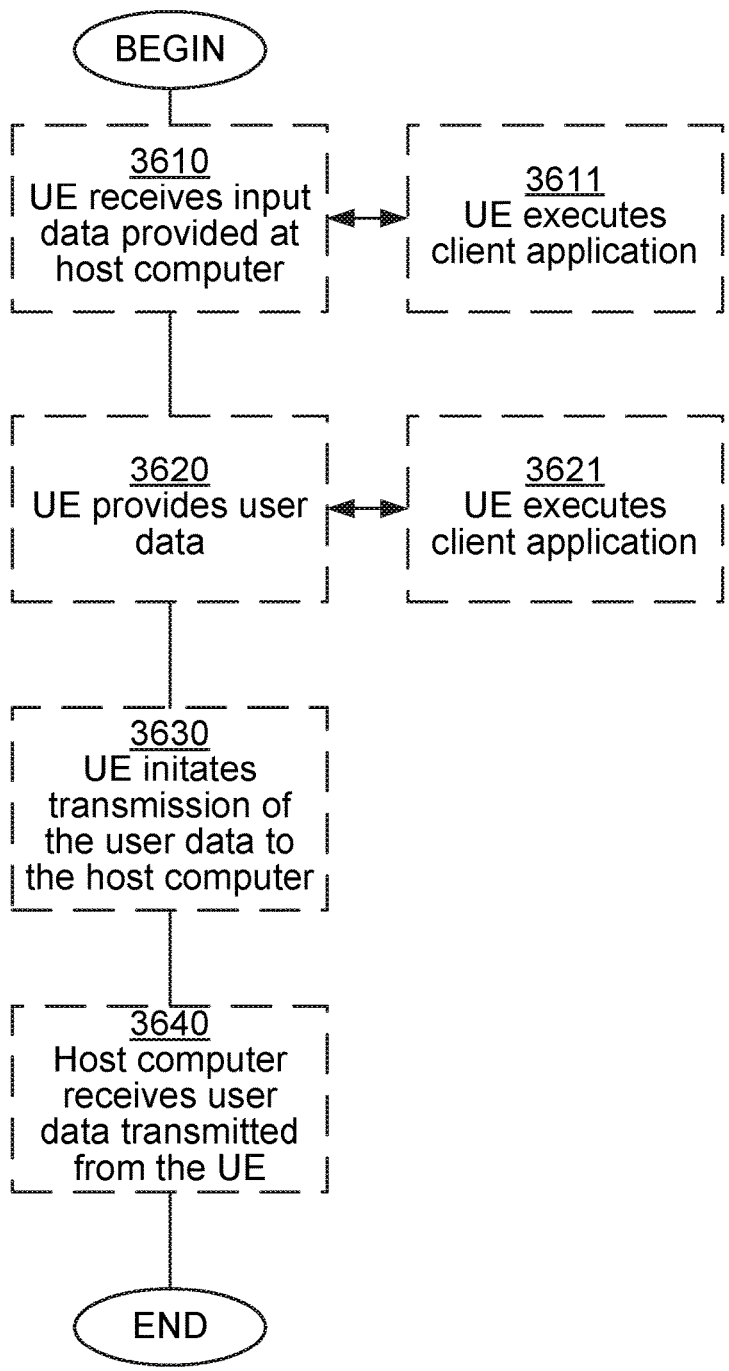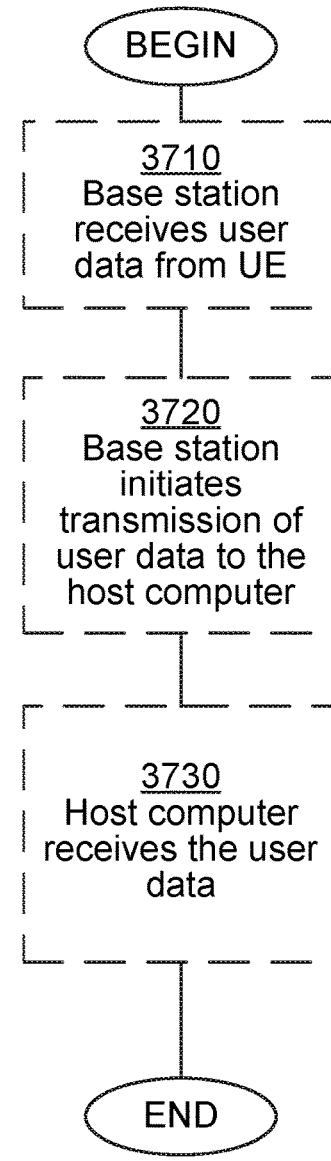
Fig. 12
Fig. 13

DETECTING WHEN A UE IS AIRBORNE

CROSS REFERENCE TO RELATED APPLICATION(S)

This application is a 35 U.S.C. § 371 National Phase Entry Application from PCT/SE2018/050377, filed Apr. 12, 2018, designating the United States, the disclosure of which is incorporated herein by reference in its entirety.

TECHNICAL FIELD

The invention relates to methods, UE (User Equipment) status detectors, UEs, computer programs and computer program products for detecting when a UE is airborne.

BACKGROUND

In mobile communication systems, base stations provide communication ability to instances user equipment, UEs in one or more cells for each base station. When UEs transmit data uplink, towards the base stations, the uplink transmission can form interference for other radio communication.

UEs are sometimes provided in aerial vehicles, such as in unmanned aerial vehicles (UAVs), also known as drones. As long as an aerial vehicle is flying at a low altitude, relative to the antenna height of the base stations, the airborne UE behaves like a conventional UE on the ground. However, once an aerial vehicle is flying well above the antenna height of the base stations, the airborne UE has line-of-sight, and thus improved radio transmissions, to/from more base stations than a UE on the ground. This results in the uplink signal from the airborne UE becoming more prominent in multiple cells. The uplink signal from the airborne UE thus increases interference in neighbouring cells. The increased interference has a negative impact for UEs on the ground, e.g. smartphone, IoT device, etc. Similarly, such line-of-sight conditions to multiple cells lead to higher downlink interference to the aerial UE.

Moreover, many UAVs are used for transmitting a video feed to its flight controller, which implies large amounts of uplink streaming traffic for the network. Based on the traffic characteristics and the control characteristics, the mobile operators are thus likely to put the airborne UEs in a separate service class, and associating different policies on them. Thus, it is important that it is possible to identify if a UE is an airborne UE or a regular ground-based UE to provide the right service optimization for UAV UEs while protecting the performance of ground UEs from the potential interfering signals from UAV UEs.

For legitimate UAV UEs, mechanisms in standards can be enforced so that these UAV UEs can be identified by the networks. For example, it can be required that a UAV operator should acquire a Subscriber Identity Module (SIM) card that is designed or registered for UAV use if the UAV is to implement a UE making use of a cellular connection. Another method could be to introduce a direct indication mechanisms in the standards so that UAV UEs will inform the network when they are airborne. However, this method cannot be used by legacy UEs.

It is more challenging to identify rogue airborne UEs that either are not registered with the networks or do not support direct indication of flying mode. For example, there are some cases where a normal UE is attached to a UAV and is flown over the network, without indicating to the network of its airborne capability. The airborne UE may then generate excessive interference to the network and may not even be allowed by regulations in some regions. It is critical to identify these unlicensed airborne UEs from both an operator and a security perspective.

In the written submission R2-1713408 for 3GPP TSG-RAN WG2 #100, it is presented a method for UAV identification. It is shown that using measurement reports from the UE, it is possible to detect a potentially interfering UE and identify whether this UE is a flying UE at the same time. The detection is based on a combination of RSRP (Reference Signal Received Power) and RRSI/RSRQ (Received Signal Strength Indicator/Reference Signal Received Quality) measurements. In the written submission, it is mentioned that RSRP measurements of serving and neighbouring cells alone are not enough to determine whether a UE is in the air or not.

SUMMARY

It is an object to improve detection of when a UE is airborne.

According to a first aspect, it is provided a method for detecting when a user equipment, UE, is airborne. The method is performed in a UE status detector and comprises the steps of: obtaining an indicator of variation of signal strengths for signals received in the UE, wherein the signals are transmitted for at least three different cells; and determining, based on the indicator of variation, when the UE is airborne.

The step of determining when the UE is airborne may comprise comparing the indicator with a threshold value.

The step of determining when the UE is airborne may comprise the use of a machine learning model of which the indicator of variation is an input feature and an indicator of whether the UE is airborne or not is an output feature.

The step of obtaining an indicator of variation may comprise the sub-steps of: receiving measurement reports from the UE, the measurement reports indicating strength of signals received by the UE for at least three different cells; and calculating the indicator of variation based on the measurements reports.

The step of calculating the indicator of variation may comprise calculating the indicator as a standard deviation or variation of metrics in the measurements reports.

The measurement reports may comprise at least one of the following metrics: Reference Signal Received Power, Reference Signal Received Quality, Received Signal Strength Indicator and Signal to Noise and Interference Ratio.

The step of obtaining an indicator of variation may comprise receiving the indicator of variation from the UE.

According to a second aspect, it is provided a user equipment, UE, status detector for detecting when a UE is airborne. The UE status detector comprises: a processor; and a memory storing instructions that, when executed by the processor, cause the UE status detector to: obtain an indicator of variation of signal strengths for signals received in the UE, wherein the signals are transmitted for at least three different cells; and determine, based on the indicator of variation, when the UE is airborne.

The instructions to determine when the UE is airborne may comprise instructions that, when executed by the processor, cause the UE status detector to compare the indicator with a threshold value.

The instructions to determine when the UE is airborne may comprise instructions that, when executed by the processor, cause the UE status detector to use a machine learning model of which the indicator of variation is an input feature and an indicator of whether the UE is airborne or not is an output feature.

The instructions to obtain an indicator of variation may comprise instructions that, when executed by the processor, cause the UE status detector to: receive measurement reports from the UE, the measurement reports indicating strength of signals received by the UE for at least three different cells; and calculate the indicator of variation based on the measurements reports.

The instructions to calculate the indicator of variation may comprise instructions that, when executed by the processor, cause the UE status detector to calculate the indicator as a standard deviation or variation of metrics in the measurements reports.

The measurement reports may comprise at least one of the following metrics: Reference Signal Received Power, Reference Signal Received Quality, Received Signal Strength Indicator and Signal to Noise and Interference Ratio.

The instructions to obtain an indicator of variation may comprise instructions that, when executed by the processor, cause the UE status detector to receive the indicator of variation from the UE.

According to a third aspect, it is provided a user equipment, UE, status detector comprising: means for obtaining an indicator of variation of signal strengths for signals received in a UE, wherein the signals are transmitted for at least three different cells; and means for determining, based on the indicator of variation, when the UE is airborne.

According to a fourth aspect, it is provided a computer program for detecting when a user equipment, UE, is airborne. The computer program comprises computer program code which, when run on a UE status detector causes the UE status detector to: obtain an indicator of variation of signal strengths for signals received in the UE, wherein the signals are transmitted for at least three different cells; and determine, based on the indicator of variation, when the UE is airborne.

According to a fifth aspect, it is provided a computer program product comprising a computer program according to the fourth aspect and a computer readable means on which the computer program is stored.

According to a sixth aspect, it is provided a method for enabling detecting when a user equipment, UE, is airborne. The method is performed in the UE and comprises the steps of: measuring a signal strength of respective signals for at least three cells; calculating an indicator of variation based on the signal strengths; and transmitting the indicator of variation to a UE status indicator The step of calculating the indicator of variation may comprise calculating the indicator as a standard deviation or variation of metrics of signal strength.

According to a seventh aspect, it is provided a user equipment, UE, for enabling detecting when the UE is airborne. The UE comprises: a processor; and a memory storing instructions that, when executed by the processor, cause the UE to: measure a signal strength of respective signals for at least three cells; calculate an indicator of variation based on the signal strengths; and transmit the indicator of variation to a UE status indicator The instructions to calculate the indicator of variation may comprise instructions that, when executed by the processor, cause the UE to calculate the indicator as a standard deviation or variation of metrics of signal strength.

According to an eighth aspect, it is provided a user equipment, UE, comprising: means for measuring a signal strength of respective signals for at least three cells; means for calculating an indicator of variation based on the signal strengths; and means for transmitting the indicator of variation to a UE status indicator for enabling detecting when the UE is airborne.

According to a ninth aspect, it is provided a computer program for enabling detecting when a user equipment, UE, is airborne. The computer program comprises computer program code which, when run on the UE causes the UE to: measure a signal strength of respective signals for at least three cells; calculate an indicator of variation based on the signal strengths; and transmit the indicator of variation to a UE status indicator According to a tenth aspect, it is provided a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating a cellular communication network where embodiments presented herein may be applied;

FIGS. 2A-C are schematic graphs illustrating signal strength detection for the UEs of FIG. 1;

FIGS. 3A-D are schematic diagrams illustrating embodiments of where the UE status detector can be implemented;

FIGS. 12 to 13 are flowcharts illustrating methods implemented in a communication system including a host computer, a base station and a user equipment.

DETAILED DESCRIPTION

Figure 4A:
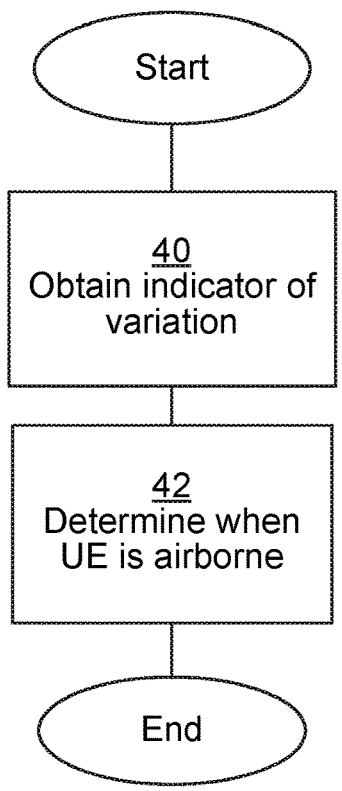
FIGS. 4A-B are flow charts illustrating methods performed in the UE status detector for detecting when a UE is airborne.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are directed to detecting when a UE is airborne. A variation indicator (variance, standard deviation, etc.) of a measurement result distribution (such as RSRP distribution) for at least three cells is used to significantly improve capability of identifying airborne UEs.

FIG. 1 is a schematic diagram illustrating a cellular communication network 8 where embodiments presented herein may be applied. The cellular communication network 8 comprises a core network and base stations 1a-c, here in the form of evolved Node Bs, also known as eNode Bs or eNBs. The base stations 1a-c could also be in the form of gNode Bs, Node Bs, BTSs (Base Transceiver Stations) and/or BSSs (Base Station Subsystems), etc. The base stations 1a-c can be implemented as respective stand-alone devices or split in distributed radio processing units and centralised processing units for baseband processing and/or other processing. The base stations a-c provides radio connectivity over a wireless interface 4a-b to a plurality of instances user equipment, UEs, 2a-c, via one or more cells (also known as radio cells). One base station can be responsible for radio transmissions and radio reception in one or more transmission points. When there are multiple transmission points for a base stations, the transmission points can be geographically separated. The term UE is also known as mobile communication terminal, wireless device, mobile terminal, user terminal, user agent, wireless terminal, machine-to-machine device etc., and can be, for example, what today are commonly known as a mobile phone, smart phone, smart watch or a tablet/laptop with wireless connectivity.

The cellular communication network 8 may e.g. comply with any one or a combination of 5G NR (New Radio), LTE (Long Term Evolution), LTE-Advanced W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink (DL) communication occurs from the base stations 1a-c to one or more of the wireless devices 2a-c and uplink (UL) communication occurs from wireless devices 2a-c to one or more of the base stations 1a-c. The quality of the wireless radio interface for each wireless device 2a-c can vary over time and depending on the position of the wireless device 2a-c, due to effects such as fading, multipath propagation, interference, etc.

The base station 1 is also connected to a core network for connectivity to central functions and a wide area network 7, such as the Internet. Also connected to the wide area network 7 is a server 6.

In the example of FIG. 1, the first UE 2a and the second UE 2b are carried by users on the ground. At the same time, the third UE 2c is airborne, e.g. being mounted on a UAV 5. The third UE 2c has free line of sight to all three base stations 1a-c, and thus interferes with other transmissions both in uplink and downlink.

On the ground, the coverage area of a base station is usually an approximate enclosed area around the base station, i.e. in one or more cells. On the other hand, the coverage area of a base station in the sky is fragmented into several discontinuous areas, due to the line of sight situation, but also due to antennas typically being directed downwards, leading to different lobe characteristics towards the sky. In any case, the cell used for transmissions are identifiable by a receiver, e.g. using a cell identifier. Alternatively or additionally, cells and/or individual transmission points are identified by different reference signals.

In order to mitigate the interference situation, embodiments presented herein are employed to detect when a UE is airborne.

FIGS. 2A-C are schematic graphs illustrating signal strength detection for the UEs 1a-c of FIG. 1. In all of FIGS. 2A-C, strength of received signal increases to the right. The strength of received signal can be measured using any suitable measurement as exemplified below. A first value 11a of strength indicates the strength of a signal received by a UE for a cell of the first base station 1a. A second value 11b of strength indicates the strength of a signal received by a UE for a cell of the second base station ib. A third value 11c of strength indicates the strength of a signal received by a UE for a cell of the third base station 1c.

FIG. 2A illustrates the received signal strengths observed by the third UE 2c, which is airborne. In this situation, the values 11a-c of strength are similar for the cells of all three base stations a-c, with the slight difference indicating the difference in path loss.

FIG. 2B illustrates the received signal strengths observed by the first UE 2a, which is ground-based and closer to the first base station 1a. In this situation, the value 11a of strength for the cell of the first base station is strongest, after which the value 11b of strength for the cell of the second base station follows. The value 11c of strength for the cell of the third base station 1c is much lower, both due to path loss but also due to obstacles, reflections, etc.

FIG. 2C illustrates the received signal strengths observed by the second UE 2b, which is ground-based and close to middle between the first base station 1a and the second base station. In this situation, the values 11a, 11b of strength for the cells of the first and second base stations are very similar, which might result in a handover situation when the second UE 2b subsequently moves. The value 11c of strength for the cell of the third base station 1c is much lower, both due to path loss but also due to obstacles, reflections, etc.

Comparing the situation for the second UE 2b in FIG. 2C and the third UE 2c in FIG. 2A, it is clear that it is not sufficient to only consider the two strongest signal strengths. Any UE on the ground will eventually pass a line where a handover will occur, corresponding to the situation illustrated in FIG. 2C. If only the two strongest signal strengths are considered, the situation of FIGS. 2A and 2C are indistinguishable, leading to either false negative or false positive determinations of airborne UEs.

On the other hand, by considering the variation of signal strengths for at least three cells, the situation of FIG. 2A is clearly distinguishable from the situation of FIG. 2C, leading to great accuracy in determining when a UE is airborne.

FIGS. 3A-D are schematic diagrams illustrating embodiments of where a UE status detector 10 can be implemented. The UE status detector is used to determine when a UE is airborne.

In FIG. 3A, the UE status detector 10 is shown implemented in one of the base stations 1a-c of FIG. 1, here represented by a single base station 1. The base station 1 is thus here the host device for the UE status detector 10.

In FIG. 3B, the UE status detector 10 is shown implemented in the server 6. The server 6 is thus here the host device for the UE status detector 10.

In FIG. 3C, the UE status detector 10 is shown implemented in the UE 2. The UE 2 is thus here the host device for the UE status detector 10.

In FIG. 3D, the UE status detector 10 is shown implemented as a stand-alone device, i.e. without a host device.

Figure 4B:
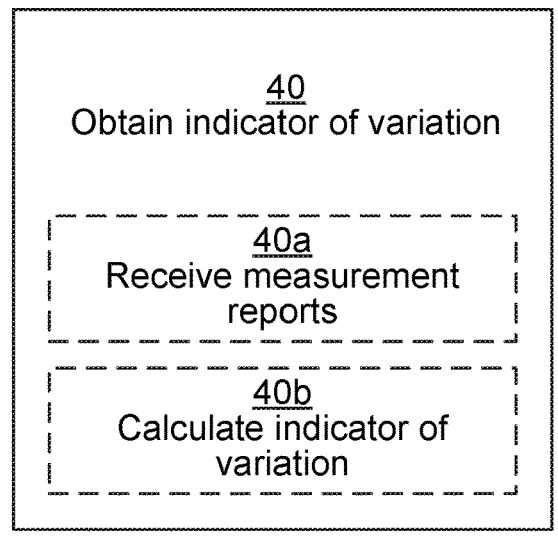

FIGS. 4A-B are flow charts illustrating methods performed in the UE status detector 10 for detecting when a UE is airborne. First, FIG. 4A will be described.

In an obtain indicator of variation step 40, the UE status detector obtains an indicator of variation of signal strengths for signals received in the UE. The signals are transmitted for at least three different cells. The reason that at least three different cells form part of the base for the indicator of variation is illustrated in FIGS. 2A-C and described above.

Optionally, the indicator of variation is received from the UE.

Alternatively, the indicator of variation is calculated in the UE status detector, e.g. as illustrated in FIG. 4B and described below.

In a determine when UE is airborne step 42, the UE status detector determines, based on the indicator of variation, when the UE is airborne.

In one embodiment, this step comprises the use of a machine learning model. In the machine learning mode, the indicator of variation is an input feature and an indicator of whether the UE is airborne or not is an output feature.

As known in the art per se, machine learning is used to find one or more output features based on a given set of one or more input features, using a predictive function. The predictive function (or mapping function) is generated in a training phase, where the training phase assumes knowledge of both input and output features. A test phase comprises predicting the output for a given input. Machine learning are known in the art to be applied e.g. for curve fitting, facial recognition and spam filtering.

For machine learning to work well, there needs to be a clear correlation between values of the output feature and the values of the one or more input features. Hence, for a machine learning model, the selection of input and output features is of utmost importance for how well the machine learning model performs. The selection of the input and output features is not trivial since there are a plethora of different candidates for any one application.

The inventors of embodiments presented herein have found that the use of a machine learning model with the indicator of variation as the input feature and the indicator of whether the UE is airborne or not as the output feature achieves exceptional performance.

Alternatively, instead of the use of a machine learning model, this step comprises comparing the indicator of variation with a threshold value. The threshold value can be obtained by analysing values for the indicator of variation for different known states of the UE, i.e. airborne or not airborne.

Looking now to FIG. 4B, this illustrates optional substeps of the obtain indicator of variation step 40 of FIG. 4A.

In an optional receive measurement reports step 40a, the UE status detector receives measurement reports from the UE. The measurement reports indicate strength of signals received by the UE for at least three different cells. In this way, measurements already implemented can be exploited by the UE status detector for the new purpose of determining when the UE is airborne.

For instance, the measurement reports comprise at least one of the following metrics: Reference Signal Received Power (RSRP), Reference Signal Received Quality (RSRQ), Received Signal Strength Indicator (RSSI) and Signal to Noise and Interference Ratio (SINR). The measurement report can be specific for a cell.

In one embodiment, a single metric (but for at least three cells) is used for determining when the UE is airborne. For instance, the single metric can be RSRP. RSRP has been found in many cases to be sufficient and provides good performance when used for detecting when a UE is airborne.

In an optional calculate indicator of variation step 40b, the UE status detector calculates the indicator of variation based on the measurements reports. The indicator of variation can be calculated as a standard deviation or variation of metrics in the measurements reports.

Figure 5:
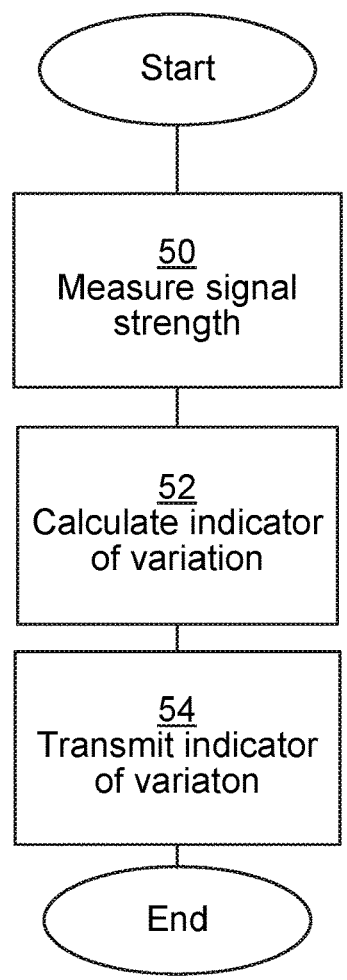
FIG. 5 is a flow chart illustrating methods performed in the UE for enabling detecting when the UE is airborne.

FIG. 5 is a flow chart illustrating methods performed in the UE for enabling detecting when the UE is airborne.

In a measure signal strength step 50, the UE measures a signal strength of respective signals for at least three cells.

In a calculate indicator of variation step 52, the UE calculates an indicator of variation based on the signal strengths. The indicator of variation can be calculated as a standard deviation or variation of metrics of signal strength.

In a transmit indicator of variation step 54, the UE transmits the indicator of variation to a UE status indicator. The indicator of variation can be transmitted by introducing a new RRC (Radio Resource Control) report configuration, for example by introducing the reporting of measurement result standard deviation or measurement result variance.

In one embodiment, the UE measures the maximum number of cells that it can measure for calculating the indicator of variation. In one embodiment, the reported indicator of variation also includes an additional field indicating the number of cells being sources for measurements used in the calculation.

In LTE, measurement reports are transmitted uplink from the UE only for the top cells. By using embodiments of methods illustrated in FIG. 5, the indicator of variation can be based on measurements of signals from an arbitrary number of cells. This is particularly useful for airborne UE detection since an airborne UE can in some cases measure signals from a great number of cells.

In step 40b or 52, the variance $\sigma_i^2$ of the metric RSRP for a cell i can be calculated in the UE status detector or in the UE according to:

$$\sigma_i^2 = \sum_{n_i \in N_i} \frac{(RSRP_{n_i} - \mu_i)^2}{|N_i|} \quad (1)$$

where $N_i$ is the set of cells included in the calculation, $RSRP_{n_i}$ is the RSRP of the cell $n_i$, $|N_i|$ is the cardinality of the set $N_i$, and $$\mu_i = \sum_{n_i \in N_i} \frac{RSRP_{n_i}}{|N_i|} \quad (2)$$

Embodiments presented herein enable greatly improved performance in detecting an airborne UE for several reasons. The use of the indicator of variation of the measurement result distribution provides better separation of the output feature (airborne UE versus not airborne UE). This is due to the distribution contains more information compared to features used in the prior art.

The proposed method applies to rogue/unlicensed drone UE detection or drone UEs that do not support direct indication of flying mode.

Figure 6:
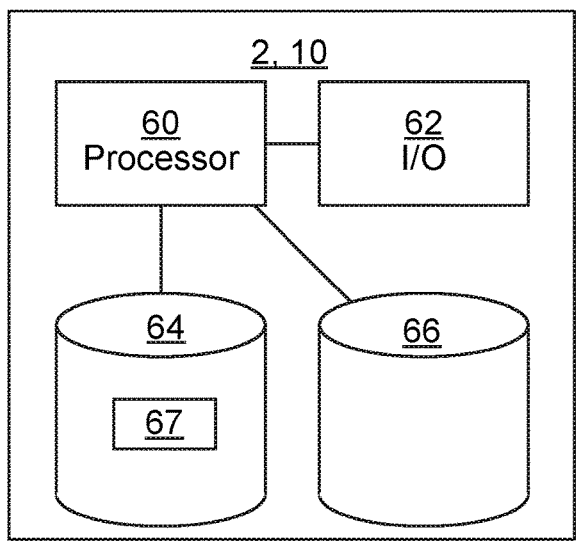
FIG. 6 is a schematic diagram illustrating components of any one of the UEs of FIG. 1, illustrated here by one UE, as well as components of the UE status detector of FIGS. 3A-D.

FIG. 6 is a schematic diagram illustrating components of any one of the UEs 2a-c of FIG. 1, illustrated here by one UE 2, as well as components of the UE status detector 10 of FIGS. 3A-D. It is to be noted that one or more of the mentioned components can be shared with the host device, when applicable. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the methods described with reference to FIGS. 4A-B and FIG. 5, respectively, above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with internal and/or external entities.

Other components of the UE 2 and the UE status detector 10 are omitted in order not to obscure the concepts presented herein.

Figure 7:
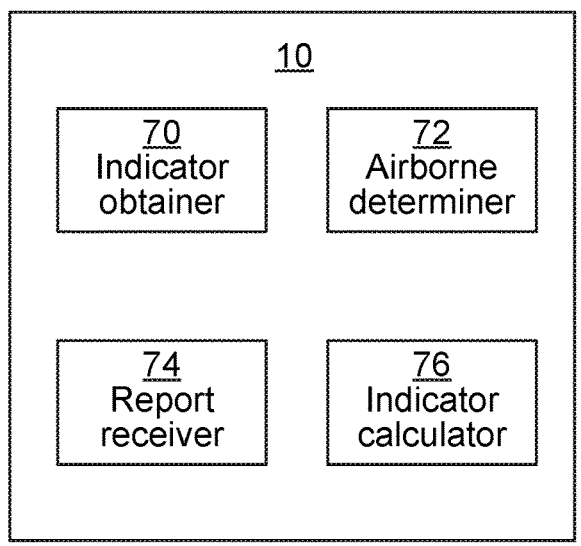
FIG. 7 is a schematic diagram showing functional modules of the UE status detector of FIGS. 3A-D according to one embodiment.

FIG. 7 is a schematic diagram showing functional modules of the UE status detector 10 of FIGS. 3A-D according to one embodiment. The modules are implemented using software instructions such as a computer program executing in the UE status detector 10. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A and 4B.

An indicator obtainer 70 corresponds to step 40 of FIG. 4A. An airborne determiner 72 corresponds to step 42 of FIG. 4A. A report receiver 74 corresponds to step 40a of FIG. 4B. An indicator calculator 76 corresponds to step 40b of FIG. 4B.

Figure 8:
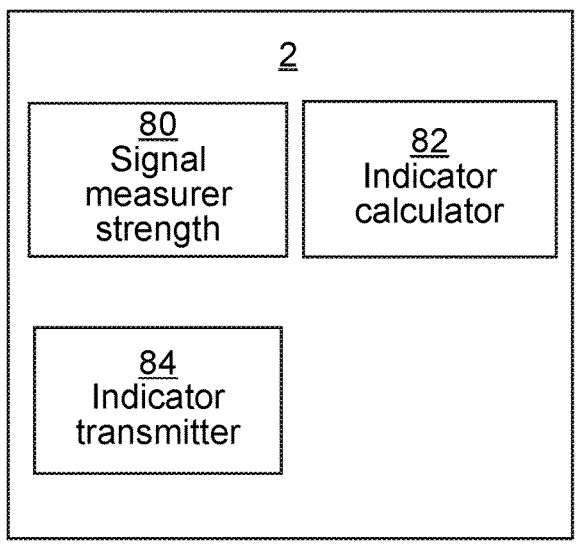
FIG. 8 is a schematic diagram showing functional modules of any one of the UEs of FIG. 1, here represented by a single UE, according to one embodiment.

FIG. 8 is a schematic diagram showing functional modules of any one of the UEs 2a-c of FIG. 1, here represented by a single UE, according to one embodiment. The modules are implemented using software instructions such as a computer program executing in the UE 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 5.

A signal strength measurer 80 corresponds to step 50 of FIG. 5. An indicator calculator 82 corresponds to step 52 of FIG. 5. An indicator transmitter 84 corresponds to step 54 of FIG. 5.

Figure 9:
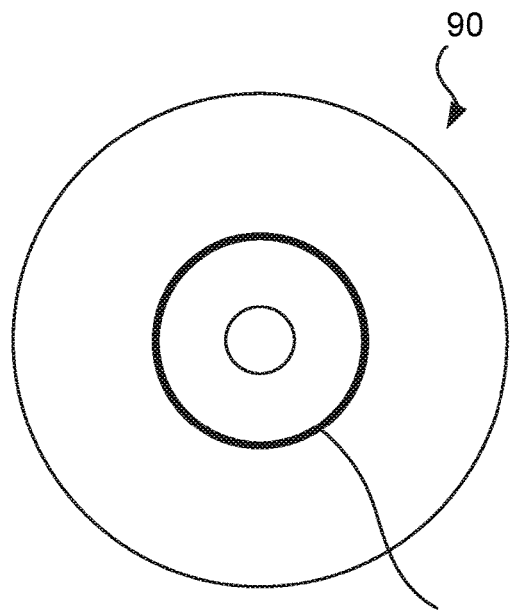
FIG. 9 shows one example of a computer program product comprising computer readable means.

FIG. 9 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

Figure 10:
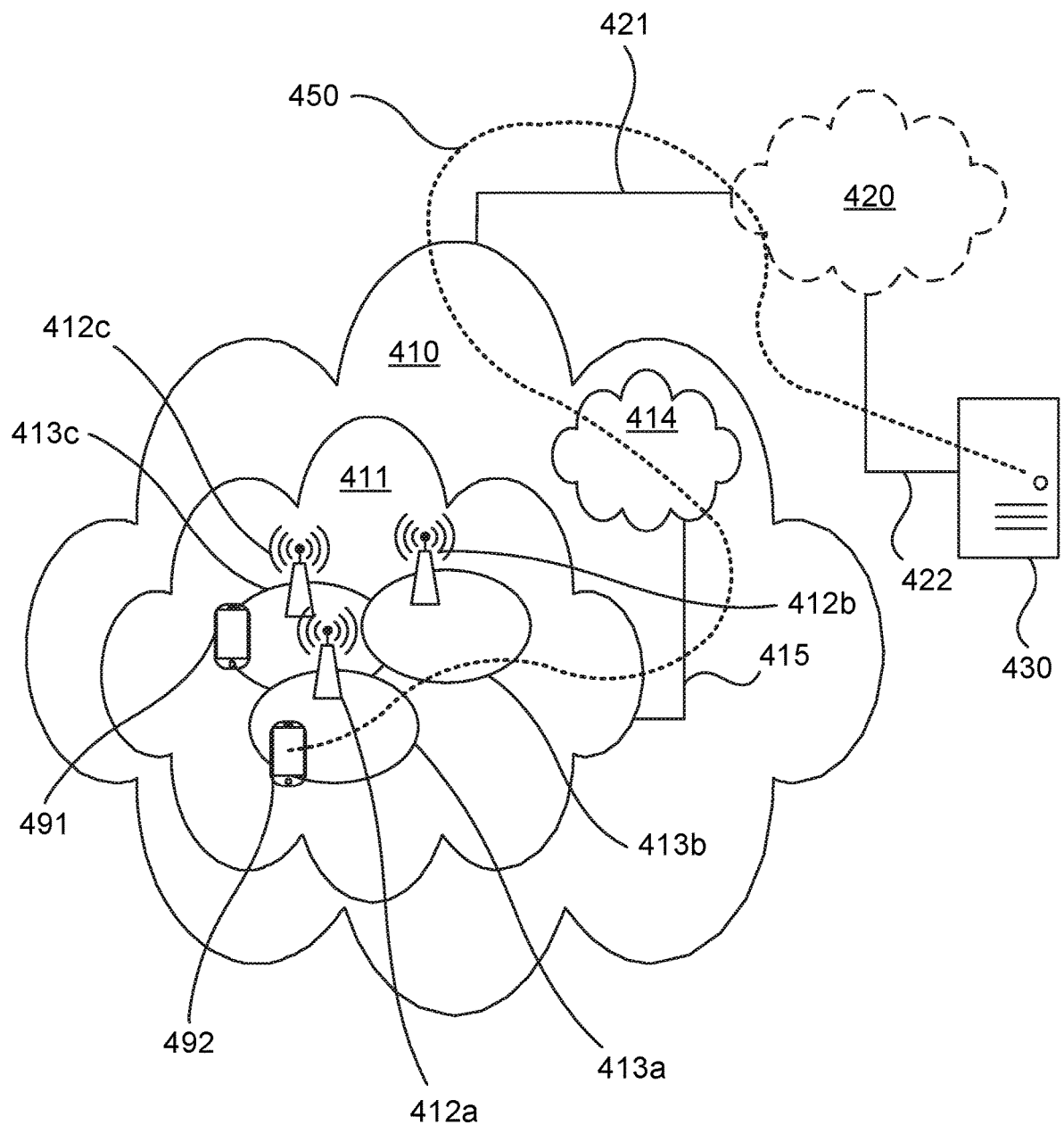
FIG. 10 is a schematic diagram illustrating a telecommunication network connected via an intermediate network to a host computer in accordance with some embodiments.

FIG. 10 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs (next Generation Node B)(each corresponding to the base stations 1a-c of FIG. 1) or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412. The UEs 491, 492 correspond to the UEs 2a-c of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
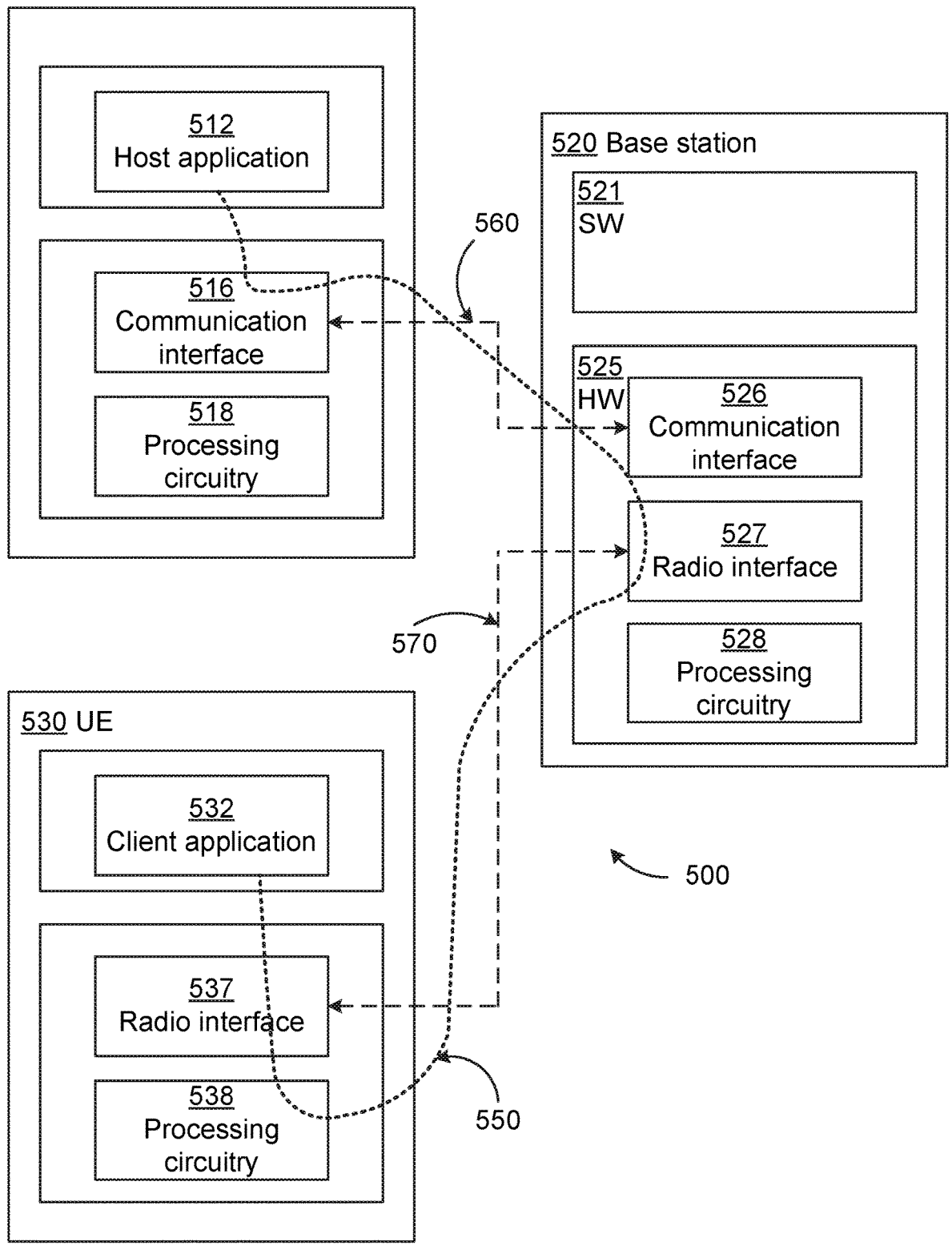
FIG. 11 is a schematic diagram illustrating host computer communicating via a base station with a UE over a partially wireless connection in accordance with some embodiments.

FIG. 11 is a schematic diagram illustrating host computer communicating via a base station with a UE over a partially wireless connection in accordance with some embodiments. Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UEs 2*a-c* of FIG. 1. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. The base station 520 corresponds to the base stations 1*a-c* of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412*a*, 412*b*, 412*c* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for detecting whether a user equipment (UE) is airborne, the method being performed by a UE status detector, the method comprising:
   obtaining an indicator of variation of signal strengths for at least three signals; and
   determining, based on the indicator of variation, whether the UE is airborne, wherein
   said at least three signals comprise a first signal received at the UE, a second signal received at the UE, and a third signal received at the UE,
   the first signal is transmitted by a first network node for a first cell,
   the second signal is transmitted by a second network node for a second cell that is different from the first cell,
   the third signal is transmitted by a third network node for a third cell that is different from the first cell and the second cell,
   the first network node is different from the second network node and the third network node,
   the second network node is different from the third network node, and
   the signal strengths include a first signal strength of the first signal measured at the UE, a second signal strength of the second signal measured at the UE, and a third signal strength of the third signal measured at the UE.

2. The method according to claim 1, wherein determining whether the UE is airborne comprises comparing the indicator with a threshold value and determining whether the UE is airborne based on the comparison.

3. The method according to claim 1, wherein determining whether the UE is airborne comprises using a machine learning (ML) model configured to receive the indicator of variation as an input and output an indicator of whether the UE is airborne or not.

4. The method according to claim 1, wherein obtaining the indicator of variation comprises:
   receiving measurement reports transmitted from the UE, the measurement reports indicating strength of signals received by the UE for at least three different cells; and
   calculating the indicator of variation based on the measurements reports.

5. The method according to claim 4, wherein calculating the indicator of variation comprises calculating the indicator as a standard deviation or variation of metrics in the measurement reports.

6. The method according to claim 4, wherein the measurement reports comprise at least one of the following metrics: Reference Signal Received Power, Reference Signal Received Quality, Received Signal Strength Indicator, and Signal to Noise and Interference Ratio.

7. The method according to claim 1, wherein obtaining the indicator of variation comprises receiving the indicator of variation from the UE.

8. The method of claim 1, wherein the indicator of the variation of the signal strengths for said at least three signals is determined based on a first characteristic value of the first signal received at the UE, a second characteristic value of the second signal received at the UE, a third characteristic value of the third signal received at the UE, and an average value of the first, second, and third characteristic values.

9. The method of claim 8, wherein the indicator of the variation of the signal strengths for said at least three signals is determined based on a first difference between the first characteristic value and the average value, a second difference between the second characteristic value and the average value, and a first difference between the third characteristic value and the average value.

10. A user equipment (UE) status detector for detecting whether a UE is airborne, the UE status detector comprising:
   a processor; and
   a memory storing instructions that, when executed by the processor, cause the UE status detector to:
   obtain an indicator of variation of signal strengths for at least three signals; and
   determine, based on the indicator of variation, whether the UE is airborne, wherein
   said at least three signals comprise a first signal received at the UE, a second signal received at the UE, and a third signal received at the UE,
   the first signal is transmitted by a first network node for a first cell,
   the second signal is transmitted by a second network node for a second cell that is different from the first cell, the third signal is transmitted by a third network node for a third cell that is different from the first cell and the second cell, the first network node is different from the second network node and the third network node, the second network node is different from the third network node, and the signal strengths include a first signal strength of the first signal measured at the UE, a second signal strength of the second signal measured at the UE, and a third signal strength of the third signal measured at the UE.

11. The UE status detector according to claim 10, wherein the instructions to determine whether the UE is airborne comprise instructions that, when executed by the processor, cause the UE status detector to compare the indicator with a threshold value and determine whether the UE is airborne based on the comparison.

12. The UE status detector according to claim 10, wherein the instructions to determine whether the UE is airborne comprise instructions that, when executed by the processor, cause the UE status detector to use a machine learning (ML) model configured to receive the indicator of variation as an input and output an indicator of whether the UE is airborne or not.

13. The UE status detector according to claim 10, wherein the instructions to obtain the indicator of variation comprise instructions that, when executed by the processor, cause the UE status detector to:

receive measurement reports transmitted from the UE, the measurement reports indicating strength of signals received by the UE for at least three different cells; and calculate the indicator of variation based on the measurements reports.

14. The UE status detector according to claim 13, wherein the instructions to calculate the indicator of variation comprise instructions that, when executed by the processor, cause the UE status detector to calculate the indicator as a standard deviation or variation of metrics in the measurement reports.

15. The UE status detector according to claim 13, wherein the measurement reports comprise at least one of the following metrics: Reference Signal Received Power, Reference Signal Received Quality, Received Signal Strength Indicator, and Signal to Noise and Interference Ratio.

16. The UE status detector according to claim 10, wherein the instructions to obtain the indicator of variation comprise instructions that, when executed by the processor, cause the UE status detector to receive the indicator of variation from the UE.

17. A computer program product for detecting whether a user equipment (UE) is airborne, the computer program product comprising a non-transitory computer readable medium storing computer program code which, when run on a UE status detector causes the UE status detector to:

obtain an indicator of variation of signal strengths for at least three signals; and determine, based on the indicator of variation, whether the UE is airborne, wherein said at least three signals comprise a first signal received at the UE, a second signal received at the UE, and a third signal received at the UE, the first signal is transmitted by a first network node for a first cell, the second signal is transmitted by a second network node for a second cell that is different from the first cell, the third signal is transmitted by a third network node for a third cell that is different from the first cell and the second cell, the first network node is different from the second network node and the third network node, the second network node is different from the third network node, and the signal strengths include a first signal strength of the first signal measured at the UE, a second signal strength of the second signal measured at the UE, and a third signal strength of the third signal measured at the UE.

18. A method for enabling detecting whether a user equipment (UE) is airborne, the method being performed by the UE, the method comprising:

receiving a first signal transmitted by a first network node for a first cell;

measuring a first signal strength of the received first signal;

receiving a second signal transmitted by a second network node for a second cell;

measuring a second signal strength of the received second signal;

receiving a third signal transmitted by a third network node for a third cell;

measuring a third signal strength of the received third signal;

calculating an indicator of variation of the measured first, second, and third signal strengths of the first, second, and third signals; and transmitting the indicator of variation to a UE status indicator, wherein the first cell is different from the second cell and the third cell, the second cell is different from the third cell, the first network node is different from the second network node and the third network node, and the second network node is different from the third network node.

19. The method according to claim 18, wherein the step of calculating the indicator of variation comprises calculating the indicator as a standard deviation or variation of metrics of signal strength.

20. A user equipment (UE) for enabling detecting whether the UE is airborne, the UE comprising:

a processor; and a memory storing instructions that, when executed by the processor, cause the UE to:

receive a first signal transmitted by a first network node for a first cell;

measure a first signal strength of the received first signal;

receive a second signal transmitted by a second network node for a second cell;

measure a second signal strength of the received second signal;

receive a third signal transmitted by a third network node for a third cell;

measure a third signal strength of the received third signal;

calculate an indicator of variation of the measured first, second, and third signal strengths of the first, second, and third signals; and transmit the indicator of variation to a UE status indicator, wherein the first cell is different from the second cell and the third cell, the second cell is different from the third cell, the first network node is different from the second network node and the third network node, and the second network node is different from the third network node.

21. The UE according to claim 20, wherein the instructions to calculate the indicator of variation comprise instructions that, when executed by the processor, cause the UE to calculate the indicator as a standard deviation or variation of metrics of signal strength.

22. A computer program product for enabling detecting whether a user equipment (UE) is airborne, the computer program product comprising a non-transitory computer readable medium storing computer program code which, when run on the UE causes the UE to:

receive a first signal transmitted by a first network node for a first cell;

measure a first signal strength of the received first signal;

receive a second signal transmitted by a second network node for a second cell;

measure a second signal strength of the received second signal;

receive a third signal transmitted by a third network node for a third cell;

measure a third signal strength of the received third signal;

calculate an indicator of variation of the measured first, second, and third signal strengths of the first, second, and third signals; and transmit the indicator of variation to a UE status indicator, wherein the first cell is different from the second cell and the third cell, the second cell is different from the third cell, the first network node is different from the second network node and the third network node, and the second network node is different from the third network node.

* * * * *